Nov. 23, 1943.  G. W. NEWTON ET AL  2,334,702
SPRING SUSPENSION
Filed Aug. 24, 1937  2 Sheets-Sheet 1

BOTTOM VIEW

GAYLORD W. NEWTON
PAUL HEFTLER
BY Paul Heftler
ATTORNEY

Nov. 23, 1943.　　G. W. NEWTON ET AL　　2,334,702
SPRING SUSPENSION
Filed Aug. 24, 1937　　2 Sheets-Sheet 2
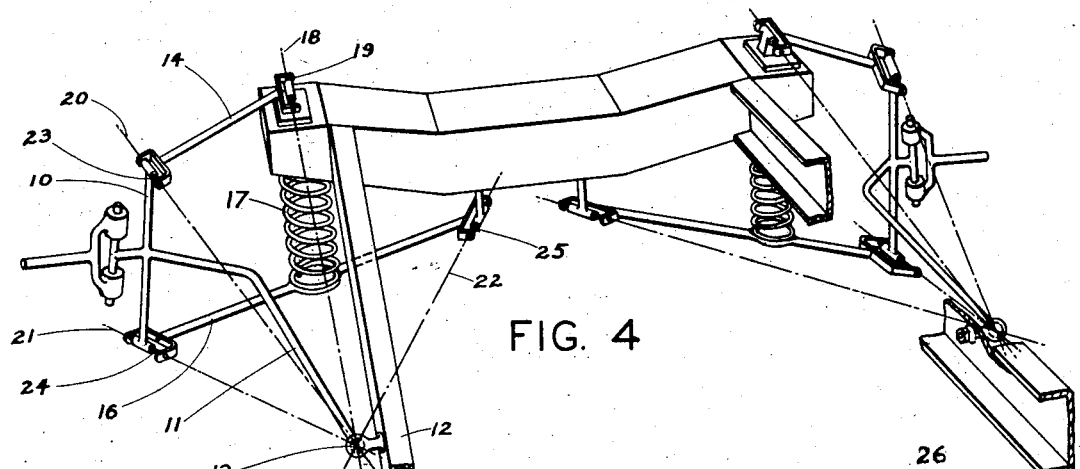
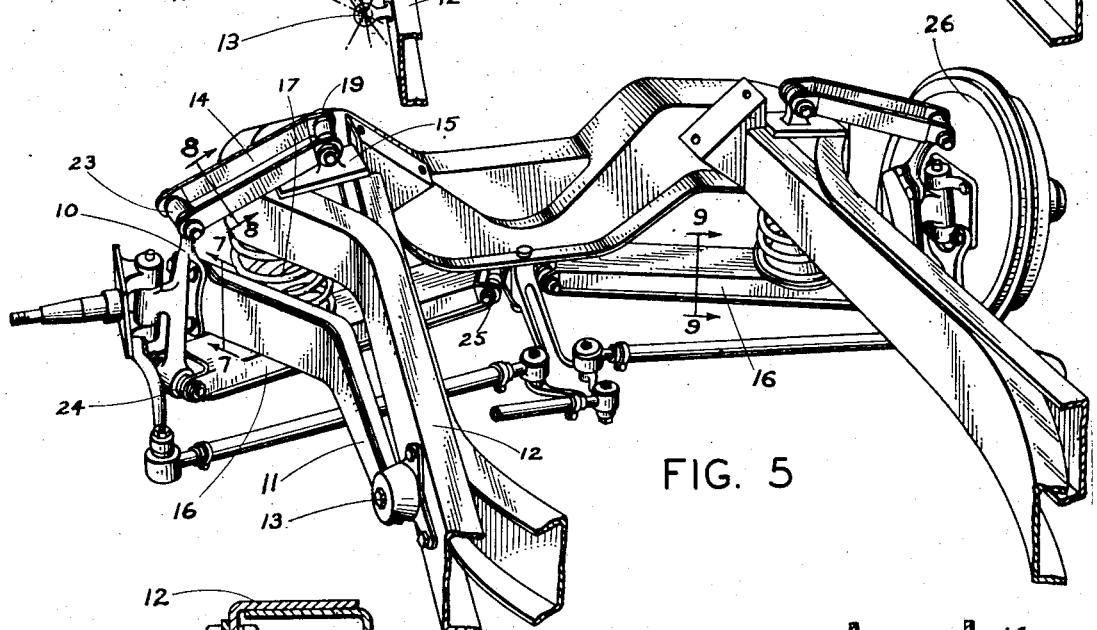
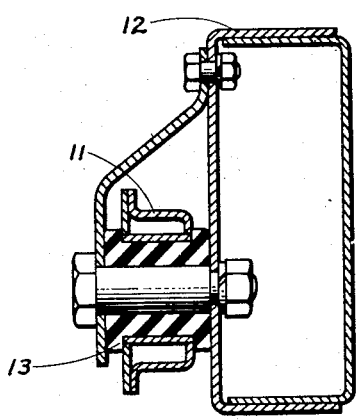
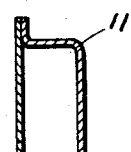
GAYLORD W. NEWTON
PAUL HEFTLER
　　　　　INVENTORS
BY　Paul Heftler
　　　　　ATTORNEY Patented Nov. 23, 1943

2,334,702

UNITED STATES PATENT OFFICE 2,334,702

SPRING SUSPENSION

Gaylord W. Newton and Paul Heftler, Seattle, Wash.

Application August 24, 1937, Serial No. 160,712
In Canada September 1, 1936

21 Claims. (Cl. 280—124)

This invention is a knee action or independent spring suspension for automobiles, and it has these advantages:

It prevents "nose-diving" during sudden stops.
It is simple.
It is strong and rigid.
It is easy to assemble.
It needs little or no adjustment.
It can be made largely of sheet metal.
It is almost as cheap as the old front axle.
It never needs oiling or greasing because all of the pivots can have rubber bushings.

Figure 1:
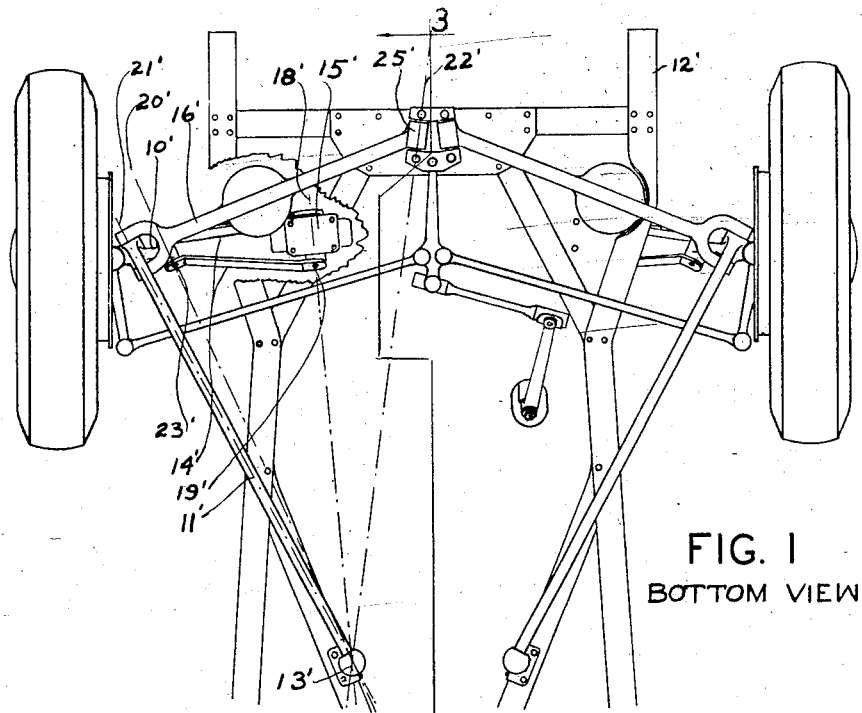
Figure 2:
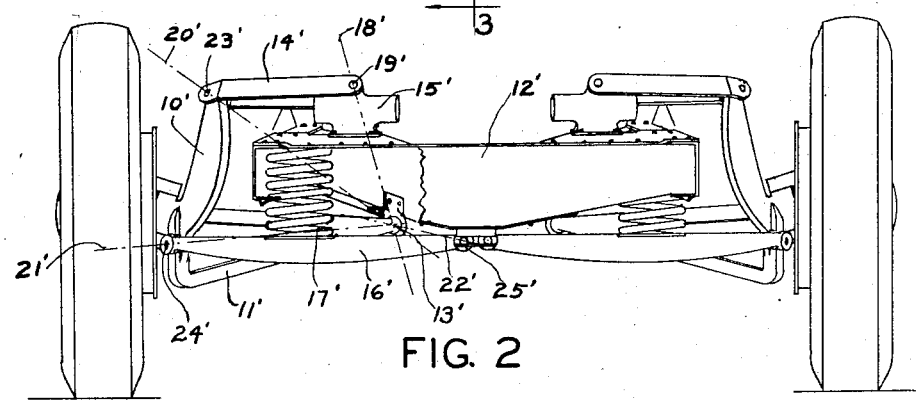
Figure 3:
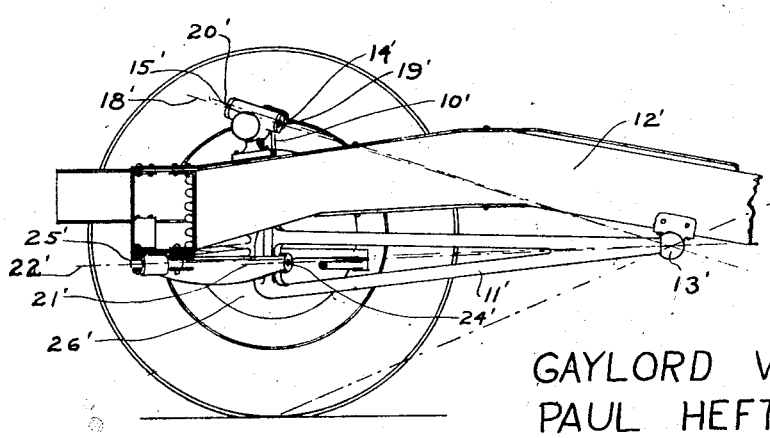

Two examples of the suspension are shown in the drawings. Figures 1 to 3 are taken from the inventors' earlier patent application (Serial No. 148,552) and show the original design. Figure 4 is a perspective diagram of the suspension, looking at it from above near the center of the car. Figures 5 to 9 show a good commercial form, Figure 5 being a general view from the rear, Figure 6 a section through the joint at the tail end of the torque arm, and Figures 7 to 9 being sections on the lines 7—7, 8—8 and 9—9 in Figure 5.

The general arrangement of the suspension may perhaps best be seen from Figure 4. In the suspension, each king-pin support or knuckle carrier 10 is rigidly fastened to a torque arm 11 whose tail end is pivoted to the frame 12 by a ball-and-socket or other equivalent joint 13. The upper and lower ends of the king-pin support are connected to the frame by two links 14 and 16, the lower link being a lever 16 upon which a coil spring 17 presses to carry the weight of the car. The axes 18, 20, 21 and 22 of the pivots 19, 23, 24 and 25 at the ends of the upper link 14 and the spring lever or lower link 16 all pass through a point called the apex of the linkage. This point or apex is at the joint 13 at the tail end of the torque arm. This lining up of the pivots so that their axes intersect as shown in Figure 4 makes the arrangement a "pyramidal linkage" and permits it to work without binding or distorting at the pivots.

Geometry of the linkage

The alignment of the pivots to form a pyramidal linkage is the invention covered by this patent and is one of the things that make this suspension better than the well-known double-wishbone knee-action used on most cars. The double-wishbone type of knee-action is based upon what is generally called a parallelogram linkage. This type of linkage is also called a four-sided prismatic linkage. It has four sides, namely, the frame, the upper wishbone, the lower wishbone and the king-pin support or knuckle carrier. These four sides are joined to each other by pivots lying along four axes which are parallel to each other. It is because the axes are parallel to each other like the edges of a prism that the linkage is called a prismatic linkage. The parts of the linkage can move relative to each other like the four sides of a four-sided open-ended box or a four-sided open-ended prism lying on its side and having the sides joined to each other by hinges.

The knee action shown in this patent differs from the double-wishbone suspension in that it is based upon a four-sided pyramidal image instead of on a four-sided prismatic linkage. In the pyramidal linkage, the axes of the pivots, instead of being parallel, converge and meet at a definite point, the apex. The four links or sides of a four-sided pyramidal linkage can move with respect to each other like the four triangular sides of a bottomless, four-sided cardboard pyramid. Playing with such a cardboard pyramid will show, better than the conventional and tedious mathematical demonstration, that the pivots of such a linkage work without binding.

It can readily be seen that, if all but a strip along the bottom of the cardboard pyramid is cut off, four strips pivoted to each other at their ends will remain, and the pivots will still work without binding. It can also be seen that any two opposite sides can extend to the apex and be connected to each other there by a ball-and-socket joint and that the pivots will still work without binding. It is upon this last form of the pyramidal linkage with two sides connected to each other at the apex that this suspension is based.

Rubber bushings

In this suspension, the three pivots 13, 23 and 24 on the king-pin support and torque arm assembly 10—11 are far apart. Therefore the loads thrown on these bearings and on the bearings 19 and 25 by the braking torque or other forces are low. Also, any "give" in the bearings will result in practically no turning or twisting of the king-pin support. For these reasons, rubber bushings, which always have some "give," may be used at all of the pivots and greasing entirely eliminated.

Ease of assembly

This suspension has no parts that can fight each other. In more technical language, it has no redundant members and is statically determinate. In the ordinary double wishbone suspension, the king-pin support is secured to one of the wishbones, either the upper or the lower, by two bearings spaced three or four inches apart along an axis which is parallel to the base of the wishbone. Two bearings there instead of one must be used to prevent the king-pin support from twisting a little about a vertical axis when the brakes are applied. Unfortunately, these two bearings prevent the king-pin carrier from swinging fore and aft, thus preventing its other end from moving anywhere except in a single plane perpendicular to the axes of the bearings on the wishbone. This is unfortunate because that other end must be connected to the other wishbone, and, to do that, the parts must be accurately adjusted so that the end of the other wishbone will also move in exactly that same plane. If this is not done, the parts will fight, and the bearings will wear rapidly.

In this suspension, there is nothing that is held in the same direction by two different parts, and therefore there can be no fighting. The whole king-pin support is held fore and aft by the torque arm alone. Each end of the king-pin support is held sideways by one link alone. The torque arm alone holds it from twisting about a vertical axis. There are no two parts that can fight because there are no two parts trying to do the same thing independently. Because the parts cannot fight, they can be assembled even if they differ appreciably from the theoretically correct shape and size. Thus accurate machining is not necessary, and the parts will go together on the assembly line without any fitting or adjustment being necessary. The first suspension of this type that was built went together like a key in a lock even though the torque arm had been lined up with the king-pin support only by eye. Because rubber housings were used, the suspension could still be easily assembled with pivots deliberately placed a quarter of an inch out of place or several degrees out of line.

Low cost

Because of the fact that the torque of the brake reaction is taken care of by the torque arm 11, the spring lever or lower link 16 and the upper link 14 are lightly stressed and can be made of simple inexpensive sheet metal stampings. The torque arm 11 can also be made of sheet metal stampings, as shown in Figures 5, 6 and 7. Because accurate machining is not necessary and the assembly is easy, as pointed out above, and because the parts may be stampings, the suspension is cheaper than any independent suspension used satisfactorily before this one.

No nose-diving

Because the torque arm 11 is a true torque arm, it can be placed so as to entirely eliminate nose-diving of the front of the car when the brakes are applied. As is well known, the weight of the car is thrown forward more on the front springs when the brakes are applied, and the added weight compresses them. However, in this suspension, the reaction of the brakes tends to rotate the brake backing plate 26 and the king-pin support 10, and it makes the torque arm 11 push up on the frame 12 at the joint 13. The parts can be so proportioned that the push-up at the joint 13 will exactly carry the added weight thrown forward onto the front wheels. The harder the brakes are applied, the greater the push-up at the end of the torque arm, so it always carries exactly the weight thrown forward. This is not just theory; the suspension has been built, and it does work that way. There is no nose-diving.

Possible variations

The form of the invention shown in Figures 4 to 9, with the addition of conventional shock absorbers and anti-sway bar, is probably the best, but many variations may be made. One alternate form is shown in Figures 1 to 3 in which the reference numerals designate the parts corresponding to the parts designated by the same reference numerals without primes in Figures 4 to 9. In this alternate form, the tail end of the torque arm 11' is secured to the frame 12' by a joint 13' on the X-bracing. This allows the torque arm 11' to be straight instead of bent as in Figures 4 to 9 and permits it to be of lighter construction. Conventional arm-type shock absorbers 15' have been used, their arms 14' forming the upper links of the suspension.

In the later design, shown in Figures 4 to 9, it is intended to use direct acting shock absorbers extending between brackets on the frame and suitable fastenings on the king-pin supports. Both these and the anti-sway bar have been omitted from the drawing because they would make the drawing more complicated. The coil springs may be replaced by air springs or by a transverse leaf spring linked to the knuckle carriers 10 or to the lower links 16 (as in Broulhiet's parallelogram type of suspension shown on page 344 of the October 1933 issue of the S. A. E. Journal and in French Patent No. 765,975). The upper links 14, which are shown as being considerably shorter than the lower links 16 in order to secure approximate straight line motion of the bottoms of the wheels, may be made longer in order to secure more nearly parallel motion of the wheels.

We claim:

1. A vehicle comprising a frame, a wheel carrying member secured to the frame by a universal joint, a ground engaging wheel on the wheel carrying member, and two links each pivoted to the frame and to the wheel carrying member, the pivots of one link being offset from the pivots of the other and the axes of the four pivots all passing through the universal joint.

2. In a vehicle, a frame having a vertically extending king pin support, a king pin carried by said support, a steering knuckle rotatable on said king pin, a ground engaging wheel rotatably mounted on said steering knuckle, and braking mechanism carried by said steering knuckle, a rigid upper link connected to the top of the king pin support and to the frame by pivots, a rigid lower link connected to the bottom of the king pin support and to the frame by pivots, said links extending transversely and substantially horizontally and the axes of their pivots intersecting at a single point, and a torque arm rigidly secured to the king pin carrier and pivoted to the frame at the point where the axes of said other pivots meet.

3. In a vehicle, a frame having an upright king pin support, a king pin carried by said support, a steering knuckle mounted to swing on said king pin, a ground engaging wheel rotatably mounted on said steering knuckle, and braking mechanism for said wheel including a backing plate fixed to said steering knuckle, a rigid non-twistable upper link connected to the top of the king pin support by a single pivot and to the frame by another single pivot, a rigid non-twistable lower link connected to the bottom of the king pin support by a single pivot and to the frame by another single pivot, and a rigid torque arm rigidly fixed to the king pin support and secured to the frame by a pivot allowing a large amount of swinging about a horizontal axis transverse to the vehicle and at least a slight amount of swinging about axes perpendicular to said transverse axis, said links extending transversely of the vehicle and substantially horizontally and the axes of all their pivots passing through the pivot of the torque arm to the frame.

4. A vehicle comprising a frame, a wheel carrying member secured to the frame by a joint, a ground engaging wheel on the wheel carrying member, two links secured to the frame and to the wheel carrying member by single hinge connections, the axis of each hinge connection being offset and at an angle to the axes of the other hinge connections and the axis of each hinge connection passing through the joint between the wheel carrying member and the frame.

5. A vehicle comprising a frame, a wheel carrying member secured to the frame by a joint, a ground engaging wheel on the wheel carrying member, two links secured to the frame and to the wheel carrying member by single hinge connections, the axis of each hinge connection being offset and at an angle to the axes of the other hinge connections and passing through the joint between the wheel carrying member and the frame, and a spring acting between the frame and one of the links.

6. In a vehicle, a frame, a vertically extending knuckle carrier, a steering knuckle swingably mounted on said knuckle carrier, a ground engaging wheel rotatably mounted on said steering knuckle, braking mechanism for said wheel including a backing plate fixed to said steering knuckle, an upper link pivoted to the top of the knuckle carrier and to the frame, a lower link connected to the knuckle carrier near its bottom and to the frame, and a forked torque arm pivoted to the frame and having one branch fixed to the knuckle carrier above the pivot of the lower link and the other branch fixed to the knuckle carrier below said pivot.

7. In a vehicle, a frame, a wheel, a member carrying the wheel and pivoted to the frame, and a pair of links, each link being pivoted at one of its ends to the frame and at its other end to the wheel carrying member, at least one of the links having the axes of its two pivots at an angle to each other.

8. In a vehicle, a frame, a wheel, a member carrying the wheel and pivoted to the frame, and a pair of links, each link being pivoted at one of its ends to the frame and at its other end to the wheel carrying member, at least one of the links having the axes of its two pivots intersecting each other.

9. In a vehicle, a frame, a wheel, a member carrying the wheel and secured to the frame by a pivot, and a pair of links, each link being pivoted at one of its ends to the frame and at its other end to the wheel carrying member, at least one of the links having the axes of its two pivots intersecting at the first-mentioned pivot.

10. A mechanical movement or linkage comprising two rigid major members, a joint connecting said members directly to each other, said joint preventing any relative translation of said members but permitting relative rotation of said members in three directions, a rigid link member, and two simple hinge or pin type joints, said link member being connected directly to each of said major members by one of said simple joints, each of said simple joints allowing the two members which it connects to rotate relative to each other about a single axis determined by that joint and preventing any relative translation or any relative rotation about any other axis, the axes of the two simple joints both passing through the center of the first joint.

11. A mechanical movement or linkage comprising two rigid major members, a joint connecting said members directly to each other, said joint preventing any relative translation of said members but permitting relative rotation of said members in three directions, two rigid link members, and four simple hinge or pin type joints, each of said link members being connected directly to each of said major members by one of said simple joints, each of said simple joints allowing the two members which it connects to rotate relative to each other about a single axis determined by that joint and preventing any relative translation or any relative rotation about any other axis, the axes of the four simple joints all passing through the center of the first joint.

12. A mechanism as described in the preceding claim in which one of the major members is the frame of an automobile and the other is an assembly comprising an upright king-pin support and a torque arm extending longitudinally from the king-pin support towards the center of the automobile to the joint between said two major members.

13. In a vehicle having a pair of road wheels each mounted on a wheel support member which is pivotally mounted between the outer ends of upper and lower laterally extending links, fixed determinate pivot axes for the inner ends of said upper and lower links on the vehicle frame arranged in non-parallel relationship longitudinally of the vehicle and divergent away from the vertical transverse plane of the center of gravity thereof, whereby said links are constrained to move upwardly or downwardly in fixed independent non-parallel planes, transverse to the longitudinal axis of the vehicle, and torque arms rigidly fixed to said wheel support members and pivoted to the frame.

14. The structure defined in the preceding claim and having the pivots of the torque arms to the frame located on a horizontal line perpendicular to the median longitudinal plane of the vehicle and intersecting said fixed determinate pivot axes.

15. The structure defined in claim 13 and having said fixed determinate pivot axes intersecting at the pivots of the torque arms to the frame.

16. In a vehicle having a pair of road wheels each mounted upon a wheel support member which is pivotally mounted between the outer ends of upper and lower laterally extending links, intersecting pivot axes for the inner ends of said upper and lower links on the vehicle frame arranged in non-parallel relation longitudinally of the vehicle and divergent away from the vertical transverse plane of the center of gravity thereof, whereby said links are constrained to move upwardly or downwardly in independent non-parallel planes, transverse to the longitudinal axis of the vehicle, and torque arms rigidly fixed to the wheel support members and pivoted to the frame at the points where said axes intersect.

17. In a vehicle having wheels and a frame, means for connecting one wheel to the frame independently of the other wheels, comprising upper and lower links, each of said links extending approximately horizontally and at least one of said links lying in a diagonal position with the end thereof that is nearer to the longitudinal central plane of the vehicle also being nearer to the adjacent end of the vehicle, each of said links having only one pivot pin associated with the end thereof that is nearer to the longitudinal central plane of the vehicle, said pivot pins forming means to secure said links to said frame and to prevent each link from having any movement relative to the frame except rotation about the axis of its pivot pin, and the axes of said pivot pins intersecting at a point farther from the adjacent end of the vehicle than the location of said pivot pins, an upright wheel support member having its upper and lower ends pivotally connected to the ends of said upper and lower links farther from the longitudinal central plane of the vehicle, means on said wheel support member for carrying said one wheel, a universal joint carried by the frame with its center coincident with said point of intersection of said axes of said pivot pins, and a member extending from said universal joint to said wheel support member.

18. In a vehicle having wheels and a frame, means for connecting one wheel to the frame independently of the other wheels, comprising an upright wheel support member adjacent said one wheel, means on said wheel support member for carrying said one wheel, a lower link extending diagonally from the lower end of said wheel support member to a point on the frame that is nearer to the adjacent end of the frame than is said wheel support member, an upper link extending from the upper end of said wheel support member to a point on the frame at a substantial distance from the longitudinal central plane of the vehicle, said links each being pivotally connected to said wheel support member at its end that is farthest from the longitudinal central plane of the vehicle and each of said links having one and only one pivot pin associated with its other end, said pivot pins forming means to secure said links to said frame and to prevent each link from having any movement relative to the frame except rotation about the axis of its pivot pin, and the axes of said pivot pins intersecting at a point farther from the adjacent end of the vehicle than the location of either of said pivot pins, said point being nearer to the longitudinal central plane of the vehicle than the pivot pin connecting the upper link to the frame, a universal joint carried by the frame with its center coincident with said point of intersection of said axes of said pivot pins, and a member extending from said universal joint to said wheel support member.

19. In a vehicle, a frame, a vertically extending king pin support, a king pin carried by said support, a steering knuckle rotatable on said king pin, a ground engaging wheel rotatably mounted on said steering knuckle, braking mechanism for said wheel including a backing plate fixed to said steering knuckle, a rigid upper link connected to the top of the king pin support and to the frame by pivots, a rigid lower link connected to the bottom of the king pin support and to the frame by pivots, said links extending transversely and substantially horizontally and the axes of their pivots intersecting at a single point, and a torque arm rigidly connected to the king pin support and pivoted to the frame at the point where the axes of the pivots of the links meet.

20. In a vehicle having independent suspension of a pair of road wheels of which each road wheel is mounted on a wheel support member which is pivotally mounted between the outer ends of upper and lower laterally extending links, fixed determinate pivot axes for the inner ends of said upper and lower links on the vehicle frame arranged in non-parallel relationship longitudinally of the vehicle, and a torque arm fixed to each wheel support member and pivoted to the vehicle frame.

21. In a vehicle having independent suspension of a pair of road wheels of which each road wheel is mounted on a wheel support member which is pivotally mounted between the outer ends of upper and lower laterally extending links, each of said links being a unitary and non-articulated member, fixed determinate pivot axes for the inner ends of said upper and lower links on the vehicle frame arranged in non-parallel relationship longitudinally of the vehicle, and a torque arm fixed to each wheel support member and pivoted to the vehicle frame.

GAYLORD W. NEWTON.
PAUL HEFTLER.